United States Patent [19]

Evans

[11] Patent Number: 5,709,933
[45] Date of Patent: Jan. 20, 1998

[54] COMPOSITE FIBER REINFORCED POLYOLEFIN

[76] Inventor: Daniel W. Evans, 8265 St. Marlo Fairway Dr., Duluth, Ga. 30155

[21] Appl. No.: 756,233

[22] Filed: Nov. 25, 1996

Related U.S. Application Data

[62] Division of Ser. No. 400,669, Mar. 8, 1995, Pat. No. 5,585,054.

[51] Int. Cl.$^6$ .......................... B32B 27/06; B32B 27/18; B32B 27/32
[52] U.S. Cl. .......................... 428/297.4; 264/83
[58] Field of Search .......................... 428/297.4; 264/83

[56] References Cited

U.S. PATENT DOCUMENTS

| | | |
|---|---|---|
| 2,825,099 | 3/1958 | Simmons . |
| 3,100,917 | 8/1963 | Wagner . |
| 3,409,711 | 11/1968 | Pashak et al. . |
| 3,453,356 | 7/1969 | Kent et al. . |
| 3,478,138 | 11/1969 | Friesner . |
| 3,815,657 | 6/1974 | Malek et al. . |
| 3,931,094 | 1/1976 | Segal et al. . |
| 4,005,183 | 1/1977 | Singer . |
| 4,078,348 | 3/1978 | Rothman . |
| 4,110,094 | 8/1978 | Motsinger . |
| 4,223,487 | 9/1980 | St. Clair . |
| 4,236,365 | 12/1980 | Wheeler . |
| 4,288,887 | 9/1981 | Johnson et al. . |
| 4,467,728 | 8/1984 | Horne . |
| 4,785,040 | 11/1988 | Gupta et al. . |
| 4,790,966 | 12/1988 | Sandberg et al. . |
| 4,832,932 | 5/1989 | Tada et al. . |
| 4,839,114 | 6/1989 | Delphin et al. . |
| 4,860,512 | 8/1989 | Thorn . |
| 4,927,579 | 5/1990 | Moore . |
| 5,042,397 | 8/1991 | Fiedler . |
| 5,044,757 | 9/1991 | Dienst . |
| 5,106,564 | 4/1992 | Iwanami et al. . |
| 5,165,941 | 11/1992 | Hawley . |
| 5,185,117 | 2/1993 | Hawley . |
| 5,238,633 | 8/1993 | Jameson . |
| 5,358,680 | 10/1994 | Biossonnat et al. . |
| 5,492,069 | 2/1996 | Alexander et al. . |
| 5,492,657 | 2/1996 | Danschikov et al. . |
| 5,585,054 | 12/1996 | Evans ............................. 264/83 |

FOREIGN PATENT DOCUMENTS 0426619  5/1991  European Pat. Off. .

*Primary Examiner*—James C. Cannon
*Attorney, Agent, or Firm*—Hinkle & Associates, P.C.

[57] ABSTRACT

A composite cellulose fiber reinforced polyolefin is enclosed. The polyolefin is manufactured by a process that includes preparing and mixing a blend of molten polyolefin, a coloring concentrate and a coupling agent in a kneading extruder, preheating cellulose fibers in an enclosed cram feed and mixing the blend of polyolefin, preheated cellulose fibers and ozone gas in a ozone chamber to form a polyolefin and fiber matrix. The polyolefin and fiber matrix is then fed to a twin screw extruder where it is further heated, mixed and then conveyed to a die to extrude the mixer to a desired shape.

21 Claims, 2 Drawing Sheets

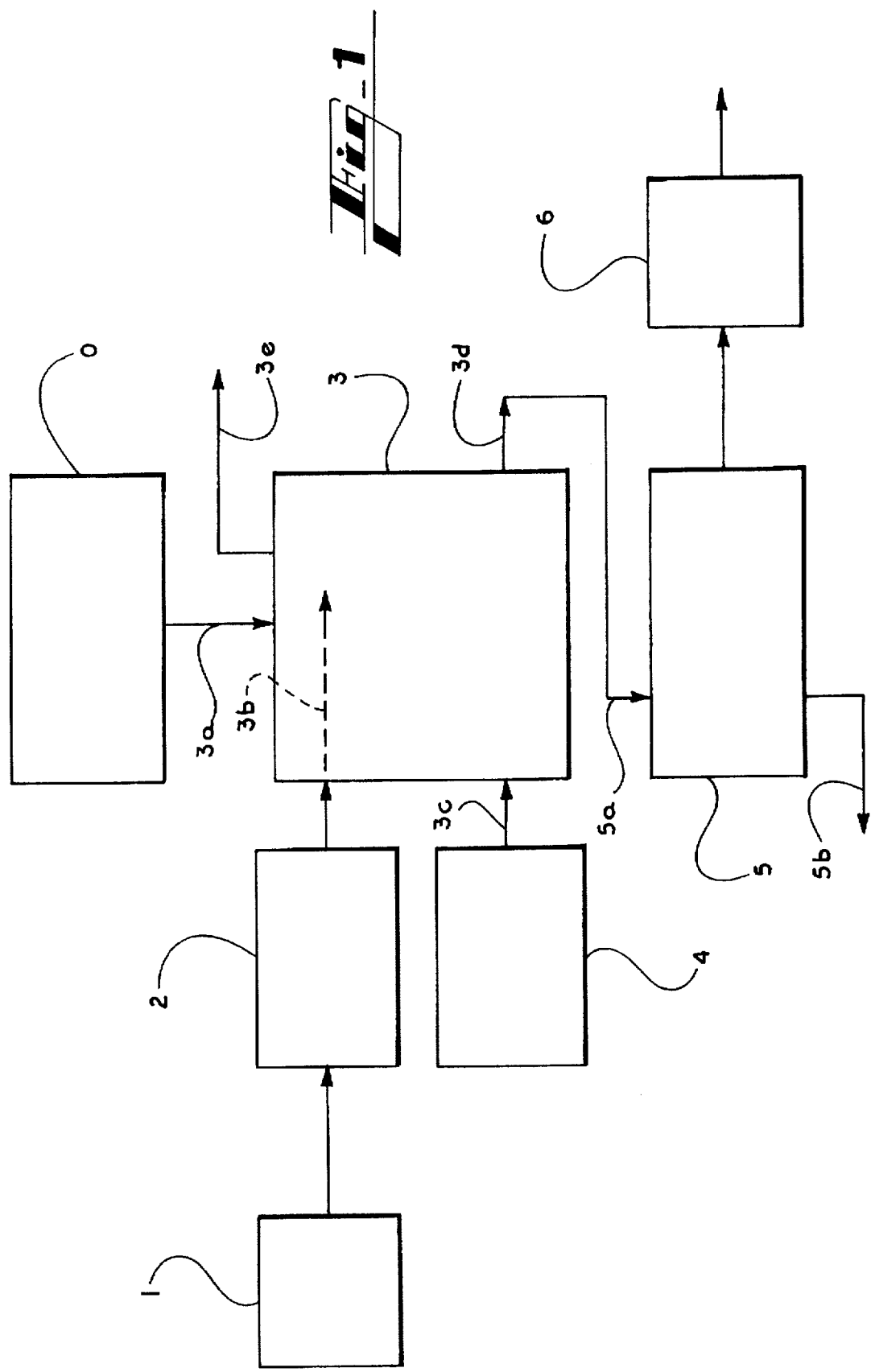

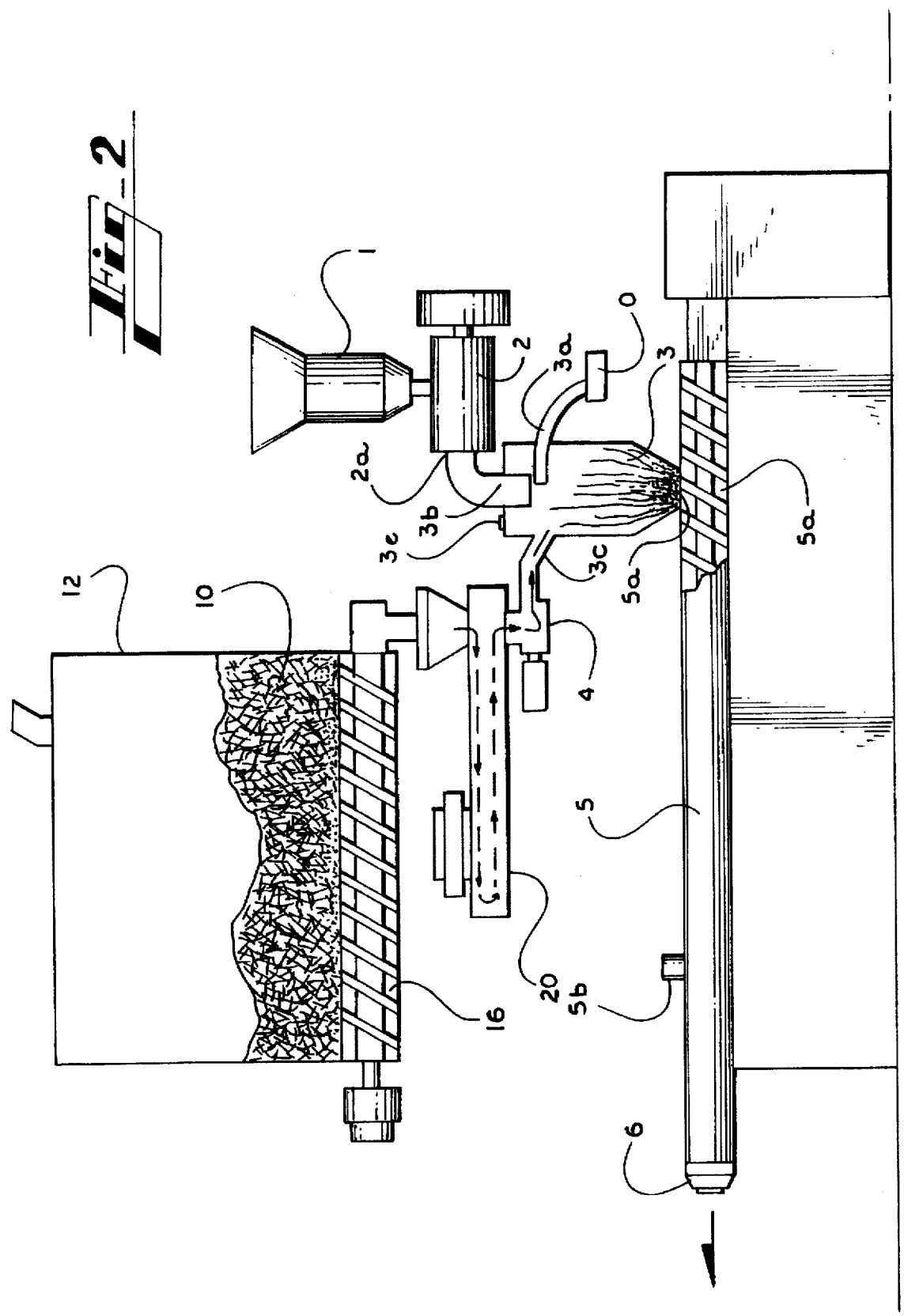

COMPOSITE FIBER REINFORCED POLYOLEFIN

RELATED PATENT DOCUMENTS

This is a divisional of U.S. patent application Ser. No 08/400,669, now U.S. Pat. No. 5,585,054, filed Mar. 8, 1995,by Daniel W. Evans, entitled "Method Of Making A Composite Fiber Reinforced Polyethylene."

BACKGROUND OF THE INVENTION

1. Field of Invention

The present invention relates to composite fiber reinforced polyethylene and a method of manufacturing the reinforced polyethylene.

2. Description of the Related Art

Methods for producing reinforced polyethylene have been difficult due to the nonpolar surface of both the polyethylene and cellulose fibers. This phenomena prohibits chemical coupling and reduces mechanical mixing between the two materials. Past efforts include combining materials into polyethylene by mixing so as to cause intertwining of the molecules. Proper intertwining requires generating sufficient mix and one hundred percent "wetting of the fiber." The wetting of the fiber refers to completely surrounding fiber molecules with polyethylene molecules.

The mixing method incorporated first added lubricants such as a wax or paraffin based low molecular weight polyethylene resin to the polyethylene, followed by injecting the cellulose fibers downstream into the melt flow of the resin when it was sufficiently molten to flow around the fibers. Without a molecular coupling, the resin that surrounds the fiber has a dramatically higher rate of expansion, causing a pull away from the surfaces between the resin and the fibers. This "pulling away" between the two surfaces causes microscopic points of leverage, resulting in a weak composite matrix. A weak composite matrix results in lower impact values and reduced structural rigidity. Additionally, the wax based polyethylene has a dramatically lower molecular weight and is, therefore, substantially weaker.

SUMMARY OF THE INVENTION

In accordance with the present invention, an extrusion process for the continuous extrusion of polyethylene and cellulose based fibers in a matrix, is disclosed. The continuous extrusion process utilizes high density polyethylene, cellulose based fibers, ozone and coupling agents. Polyethylene, cellulose based fibers and coupling agents are blended. The ozone is then added to the resultant material to create a chemically and molecularly linked reinforced polyethylene material which is gravimetrically fed through a twin screw extruder and into a die, having a sheet, profile, calibrated or accumulator head configuration. The resultant product is a composite fiber reinforced polyethylene material that has significant improvements over the existing polyethylene materials.

It is, therefore, an objective of the present invention to provide a method for producing a polyethylene and fiber matrix through a continuous extrusion process.

It is also an objective of the present invention to produce a composite fiber reinforced polyethylene material that has improved structural rigidity.

It is another objective of the present invention to produce a composite fiber reinforced polyethylene material that has improved heat deflection temperature, reduced coefficient of thermal expansion and contraction.

It is another objective of the present invention to produce a composite fiber reinforced polyethylene material that has improved impact properties.

It is another objective of the present invention to produce a composite fiber reinforced polyethylene material that requires low raw material costs, and improved economics associated with the continuous extrusion process.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and herein:

FIG. 1 shows a flow diagram of the method of making fiber reinforced polyethylene.

FIG. 2 shows a flow diagram of the method of making fiber reinforced polyethylene with various devices utilized in the process illustrated schematically.

DESCRIPTION OF THE PREFERRED EMBODIMENT

Referring now to the drawings wherein the showings are for purposes of illustrating a preferred embodiment of the invention only and not for purposes of limiting the same, the continuous extrusion process of the present invention utilizes a high density polyethylene, made up of long chains of linked ethylene molecules. The benefit of these long chains are its superior strength properties, including rigidity and hardness.

The rigidity of the polyethylene occurs due to its crystalline properties. Additionally, the high density polyethylene has a low specific gravity and is commercially, the least expensive of commodity grade resins, in the marketplace. The high density polyethylene has a density in the range of 0.941 to 0.960 g/cc. While the high density polyethylene is the preferred material of the present invention, polyethylene resins having 500 to 2500 ethylene links in chain will also function within the boundaries of this invention. The process and resulting material will function with any material generally in the polyolefin family. For example, polypropylene and thermoplastic rubbers will also work. Polyethylene is the preferred material, primarily due to its low cost.

Generally, combining two materials to generate strength requires either a chemical or mechanical linking between the two materials, and preferably both. The term "chemical linking" means that the two materials must be chemically compatible or have sufficient random electrons with which to couple materials. By way of contrast, the term "mechanical linking" means that the molecules of each of the two materials have sufficiently long molecular strands or a dramatic molecular branching configuration to allow for the molecules to intertwine. Polyethylene molecules are generally chemically noncompatible. Furthermore, polyethylene molecules have non-polar surfaces which resist coupling. Therefore, forming matrices having polyethylene as a component have proven to be difficult.

A broad definition of cellulose fibers for the purposes of the present invention is "any fibers where the main constituents are of natural fibers or plant tissue." Common cellulose fibers include wood pulp, cotton and twine (i.e., jute, kenaf, sisal, etc.). These fibers are light, provide flexible impact properties, generate rigidity when compressed, are readily available and very economic. Additionally, old wood pallets reduced to fiber form may be utilized. Generally, the cellulosic fibers are between one and six millimeters in diameter and about thirteen millimeters long. By conducting tests, fiber lengths having lengths greater than thirteen millimeters contribute little to the material's physical properties. Longer fibers are also more difficult to process due to their propensity to "hang up" in a die. Fibers having lengths shorter than seven millimeters cause substantially decreased properties. This is likely due to less intertwining of the molecules. Shorter fibers in this process has less of a negative impact on properties due to the true chemical coupling. Since, cellulose fibers are nonpolar, they are also resistant to coupling.

The continuous extrusion process of the present invention enables the formation of a polyethylene and fiber matrix which are both chemically coupled and highly intertwined. As shown in schematically in FIGS. 1 and 2, a polymeric resin, color concentrate and coupling/mix additive are blended in a continuous mixer 1. The resin, color concentrate and coupling/mix additive are fed at a constant rate into mixer 1. Mixer 1 is heated to between 260 to 600 degrees F., with the temperature being dependent upon flow rate and melt index of the combined materials. The optimal temperature for high density polyethylene has been determined to be between 435 degrees F. and 475 degrees F. The molten, combined materials are then gravimetrically fed to a low shear kneading extruder 2. Extruder 2 acts to thoroughly mix the combined materials. The molten material is then conveyed through an open port 2a of extruder 2, where the molten, combined materials free fall into an ozone chamber 3 which has a vent 3e.

Cellulose fibers 10 are initially stored within a fiber hopper 12. The fibers are then conveyed via auger 16 to an enclosed screw cram feed 4 which proportions the cellulose fibers with consistency. Cram feed 4 is heated to between 150 degrees F. and 400 degrees F. The fibers are heated in a fiber heater 20 so that when they come into contact with the heated combined materials, the combined polyethylene fiber matrix does not chill off and cause flow concerns. The heated cellulose fibers are then conveyed into ozone chamber 3.

Ozone is pumped into ozone chamber 3 from an ozone generator 0 through a first input 3a, positioned in a top portion of chamber 3. Ozone generator 0 generates an electrical charge across a flow of oxygen and induces a corona burst. This corona burst creates ozone, atomic oxygen, oxygen free radicals, and high speed electrons. Ozone generator 0 modifies oxygen (02) to ozone (03). The molten, combined materials enter chamber 3 through a second input 3b. Input 3b is positioned on a side of chamber 3 and directly below input 3a. Input 3b actually comes to a center portion C of chamber 3, such that molten, combined materials do not hang up on the sides of chamber 3. A third input 3c is positioned directly below input 3b. Heated cellulose fibers enter chamber 3 through input 3c. The ozone, molten combined materials and fibers mix within chamber 3 and gravimetrically free fall into an extruder output 3d positioned at the bottom of chamber 3. Extruder output 3d is in flow communication with a feed throat 5a of a conventional 24:1 aspect ratio twin screw extruder 5. An output 3e, positioned at another top portion of chamber 3 acts to counter pressure build up which occurs due to ozone falling into chamber 3 through output 3a. Output 3e additionally forces oxygen to rise to the top and out of chamber 3 through 3e, thereby forming a total ozone environment in chamber 3. The coupled polyethylene fiber matrix (hereinafter referred to as cellulose fiber reinforced polyethylene) exits chamber 3 and falls into feed throat 5a of twin screw extruder 5. Remaining ozone continues to mix with the cellulose fiber reinforced polyethylene, causing greater coupling. Twin screw extruder 5 has two screws (not shown) which mixes and kneads the cellulose fiber reinforced polyethylene as it is being conveyed. The cellulose fiber reinforced polyethylene travels through the flights of the screws and is heated, thereby causing it to compress. The extruder 5 has a vent 5b, through which any remaining oxygen can exhaust. The cellulose fiber reinforced polyethylene fully stabilizes at it travels through the screws. The cellulose fiber reinforced polyethylene subsequently flows through extruder 5 and into a die 6. Die 6 may be configured in a sheet, profile, calibrated or accumulator head. The cellulose fiber reinforced polyethylene enters die 6 and is formed into a desired configuration, determined by the die head.

Proper chemical coupling and intertwining of the molecules occurs in chamber 3. The highly charged free radical electrons attached to the oxygen molecule attacks the surface of the polyethylene and creates oxidation. This oxidation is highly unstable, and susceptible to fairly quick surface electron recoupling. The oxidized polyethylene surface becomes highly polarized. Concurrently, ozone reacts with the cellulose fibers. Free radical electrons oxidize the surface of the cellulose fibers, likely with the hydroxyl, carbonyl and amide groups. While the exact reaction schematic is unknown, the reaction between the oxygen and polyethylene and oxygen and cellulose fibers result in polyethylene and cellulose fibers having highly polarized surfaces. The now free radical electrons seek to stabilize by coupling with other free radical electrons. That is, the surface free radicals in the polyethylene couple with the surface free radicals in the fiber and create a permanent molecular bond. The ozone discharges its unstable electrons to the polyethylene or cellulose fibers and converts back to oxygen. By converting back to oxygen, the molecule rises to the top of chamber 3 and exits through output 3e.

Contacting molten polyethylene (combined materials) with the cellulose fibers in the ozone chamber 3, permits full wetting of the fiber and substantially improved surface to surface contact between the polyethylene and the fibers, thereby allowing for chemical coupling. Fully wetting the fibers with the polyethylene prior to twin screw extruder 5, provides less abrasion to the screw (not shown) and the barrel (not shown) of extruder 5. Additionally, twin screw 5 provides improved mix at much lower temperatures and less shear, both of which are beneficial to the cellulose fibers.

Coupling/mixing agents added to the polyethylene include small quantities of grafted, low melt polyethylene copolymer maleic anhydride. This copolymer aids in the dispersion and mix of the cellulose fibers. Additionally, melting EDPM rubber into polyethylene aids in coupling between polyethylene and the fibers. EDPM rubber has a similar melt, but is highly polarized. Coating or blending additives such as ethylene/acrylic acid copolymer, chromium complexes, silanes, titanates, and zirconium aluminates aid in coupling the fibers, since these additives have highly polarized molecules. The additives listed above can be melted or blended in various proportions, and added in concentrations from 0 to 20% to achieve customized physical properties. Generally, addition of more additives results in lower, desired physical properties. However, when concerned with large percents of fibers, the additives act as lubricants that dramatically aid in improving mix and wetting.

The subsequent composite fiber reinforced polyethylene material has significantly improved marketability over other equivalents, namely:

1) Substantially improved structural rigidity;
2) Substantially improved heat deflection temperature;
3) Substantially reduced coefficient of thermal expansion and contraction;
4) Significantly improved impact properties;
5) Significantly improved raw material costs; and
6) Significantly improved economics associated with the continuous extrusion process.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A composite cellulose fiber reinforced polyolefin derived from a polyolefin treated in a molten state with ozone.

2. The composite cellulose fiber reinforced polyolefin of claim 1, further comprising:
   a polyolefin resin.

3. The composite cellulose fiber reinforced polyolefin of claim 1, further comprising:
   cellulose fibers having a diameter of between one and six millimeters and length of no more than one half inch.

4. The composite cellulose fiber reinforced polyolefin of claim 1, further comprising: 0%–20% by weight of a coupling/mix additive selected from the group consisting of grafted, low melt polyethylene copolymer maleic anhydride, EDPM rubber, ethylene/acrylic copolymer, chromium complexes, silanes, titanates and zirconium aluminates.

5. The composite cellulose fiber reinforced polyolefin of claim 1, further comprising:
   a coloring concentrate.

6. A composite fiber reinforced polyolefin produced by a process having the steps of:
   (a) blending a polyolefin in a mixer;
   (b) forming a molten, combined material from step (a);
   (c) feeding the molten, combined material to a low shear kneading extruder;
   (d) mixing the molten combined material in the extruder;
   (e) conveying the molten, combined material through an open port of the extruder;
   (f) conveying fibers through an enclosed screw cram feed;
   (g) pumping ozone into a ozone chamber through a first input of the ozone chamber;
   (h) conveying the molten, combined material into the ozone chamber through a second input of the ozone chamber;
   (i) conveying the fibers through a third input into the ozone chamber;
   (j) mixing the ozone, the molten, combined material and the fibers to form a polyolefin and fiber matrix in the ozone chamber;
   (k) conveying the polyolefin and fiber matrix from the ozone chamber to a feed throat of a twin screw extruder;
   (l) mixing the polyolefin and fiber matrix in the twin screw extruder; and,
   (m) extruding the polyolefin and fiber matrix through the twin screw extruder into a die having a desired shape.

7. A composite fiber reinforced polyolefin as claimed in claim 6, wherein the fiber is a natural fiber.

8. A composite fiber reinforced polyolefin as claimed in claim 7, wherein the natural fiber is selected from the group consisting of wood pulp, cotton, jute, kenaf and sisal.

9. A composite fiber reinforced polyolefin as claimed in claim 6, wherein the polyolefin is a polyolefin resin.

10. A composite fiber reinforced polyolefin as claimed in claim 9, wherein the polyolefin resin is selected from the group consisting of polyethylene, polypropylene and thermoplastic rubber.

11. A composite fiber reinforced polyolefin as claimed in claim 9, wherein the polyolefin resin is a high density polyethylene resin.

12. A composite fiber reinforced polyolefin as claimed in claim 11, wherein the high density polyethylene resin has a density in the range of 0.941 g/cc to 0.960 g/cc.

13. A composite fiber reinforced polyolefin as claimed in claim 9, wherein the polyolefin resin is a polyethylene resin having 500 to 2,500 ethylene links in chain.

14. A composite fiber reinforced polyolefin as claimed in claim 6, wherein the fiber is a cellulose fiber having a diameter between one and six millimeters.

15. A composite fiber reinforced polyolefin as claimed in claim 6, wherein the fiber is a cellulose fiber having a length between seven millimeters and thirteen millimeters.

16. A composite fiber reinforced polyolefin as claimed in claim 6, further comprising a coloring concentrate.

17. A composite fiber reinforced polyolefin as claimed in claim 6, further comprising;
   a coupling/mix additive selected from the group consisting of grafted, low melt polyethylene copolymer maleic anhydride, EDPM rubber, ethylene/acrylic acid copolymer, chromium complexes, silanes, titanates and zirconium aluminates and in concentrations from zero to twenty percent by weight.

18. A composite cellulose fiber reinforced polyolefin, comprising:
   a molten state ozone-modified polyolefin resin selected from the group consisting of polyethylene, polypropylene and thermoplastic rubber;
   natural fibers selected from the group consisting of wood pulp, cotton, jute, kenaf and sisal, the natural fibers having a diameter between one and six millimeters and a length between seven and thirteen millimeters;
   a coloring concentrate; and,
   a coupling/mix additive selected from the group consisting of grafted, low melt polyethylene copolymer maleic anhydride, EDPM rubber, ethylene/acrylic acid copolymer, chromium complexes, silanes, titanates and zirconium aluminates and in concentrations from zero to twenty percent by weight.

19. A composite cellulose fiber reinforced polyolefin, as claimed in claim 18, wherein the polyethylene is a high density polyethylene resin.

20. A composite cellulose fiber reinforced polyolefin, as claimed in claim 19, wherein the high density polyethylene resin has a density in the range of 0.941 g/cc to 0.960 g/cc.

21. A composite cellulose fiber reinforced polyolefin as claimed in claim 18, wherein the polyethylene has 500 to 2,500 ethylene links in chain.

* * * * *